(12) United States Patent
Nugent

(10) Patent No.: US 11,526,938 B2
(45) Date of Patent: Dec. 13, 2022

(54) SYSTEMS AND METHODS FOR PROVIDING FINANCIAL DATA TO FINANCIAL INSTRUMENTS IN A DISTRIBUTED LEDGER SYSTEM

(71) Applicant: REFINITIV US ORGANIZATION LLC, New York, NY (US)

(72) Inventor: Tim Nugent, London (GB)

(73) Assignee: REFINITIV US ORGANIZATION LLC, New York, NY (US)

( * ) Notice: Subject to any disclaimer, the term of this patent is extended or adjusted under 35 U.S.C. 154(b) by 289 days.

(21) Appl. No.: 15/473,127

(22) Filed: Mar. 29, 2017

(65) Prior Publication Data
US 2017/0287068 A1 Oct. 5, 2017

Related U.S. Application Data

(60) Provisional application No. 62/315,919, filed on Mar. 31, 2016.

(51) Int. Cl.
| | | |
|---|---|---|
| *G06Q 40/04* | (2012.01) | |
| *G06Q 20/06* | (2012.01) | |
| *G06Q 20/22* | (2012.01) | |
| *G06Q 20/38* | (2012.01) | |
| *G06Q 20/08* | (2012.01) | |

(52) U.S. Cl.
CPC .......... *G06Q 40/04* (2013.01); *G06Q 20/065* (2013.01); *G06Q 20/08* (2013.01); *G06Q 20/223* (2013.01); *G06Q 20/3821* (2013.01); *G06Q 2220/00* (2013.01)

(58) Field of Classification Search
USPC ........................................ 705/39
See application file for complete search history.

(56) References Cited

U.S. PATENT DOCUMENTS

| | | | | |
|---|---|---|---|---|
| 9,704,143 B2* | 7/2017 | Walker | .................. | G06Q 20/06 |
| 9,904,544 B2* | 2/2018 | Thomas | .................. | G06Q 30/00 |
| 9,965,628 B2* | 5/2018 | Ford | ..................... | G06F 21/554 |
| 11,057,353 B2* | 7/2021 | Smith | ................... | H04L 9/3239 |
| 2016/0210710 A1* | 7/2016 | Glennon | ............. | G06Q 50/184 |

(Continued)

OTHER PUBLICATIONS

Anonymous—The great chain of being sure about things—The Economist (Oct. 31, 2015). https://web.archive.org/web/20160703000844/http://www.economist.com/news/briefing/21677228-technology-behind-bitcoin-lets-people-who-do-not-know-or-trust-each-other-build-dependable (Year: 2015).*

(Continued)

*Primary Examiner* — Ryan D Donlon
*Assistant Examiner* — Ayal I. Sharon
(74) *Attorney, Agent, or Firm* — Norton Rose Fulbright US LLP

(57) ABSTRACT

An embodiment of a method of providing financial data to a financial instrument smart contract in a distributed ledger system includes: receiving, by an oracle smart contract in the distributed ledger system, a transaction from the financial instrument smart contract, the transaction including registration data having an identification of financial data to be delivered and an identification of a schedule on which to deliver the financial data; generating a transaction including the financial data; and transmitting the generated transaction to at least one distributed node of the distributed ledger system according to the requested schedule.

25 Claims, 6 Drawing Sheets

(56) References Cited

U.S. PATENT DOCUMENTS

| | | | | |
|---|---|---|---|---|
| 2016/0218879 | A1* | 7/2016 | Ferrin | H04L 9/3247 |
| 2016/0357550 | A1* | 12/2016 | Thomas | G06F 8/77 |
| 2017/0048209 | A1* | 2/2017 | Lohe | H04L 63/0442 |
| 2017/0048234 | A1* | 2/2017 | Lohe | G06Q 20/065 |
| 2017/0048235 | A1* | 2/2017 | Lohe | G06Q 20/065 |
| 2017/0085545 | A1* | 3/2017 | Lohe | H04L 63/062 |
| 2017/0154331 | A1* | 6/2017 | Voorhees | G06Q 20/3829 |
| 2017/0186057 | A1* | 6/2017 | Metnick | G06Q 30/0601 |
| 2017/0279774 | A1* | 9/2017 | Booz | G06Q 20/123 |
| 2017/0287068 | A1* | 10/2017 | Nugent | G06Q 20/08 |
| 2018/0082390 | A1* | 3/2018 | Leidner | G06F 16/00 |
| 2018/0091316 | A1* | 3/2018 | Stradling | G06Q 20/3829 |
| 2019/0005469 | A1* | 1/2019 | Dhupkar | G06Q 20/06 |
| 2019/0019188 | A1* | 1/2019 | Leidner | G06Q 20/407 |
| 2019/0050855 | A1* | 2/2019 | Martino | G06Q 20/065 |
| 2020/0111092 | A1* | 4/2020 | Wood | G06F 9/45529 |

OTHER PUBLICATIONS

Bheemaiah—Block Chain 2.0—The Renaissance of Money—WIRED (Archived—Aug. 18, 2015). https://web.archive.org/web/20150818161413/https://www.wired.com/insights/2015/01/block-chain-2-0/ (Year: 2015).*

Bheemaiah—Block Chain 2.0—The Renaissance of Money—WIRED (Original—Jan. 2015). https://www.wired.com/insights/2015/01/block-chain-2-0/ (Year: 2015).*

Blockchain—Wikipedia (Mar. 30, 2016). https://en.wikipedia.org/w/index.php?title=Blockchain&oldid=712743462 (Year: 2016).*

Bustillos—The Bitcoin Boom _ The New Yorker (Apr. 1, 2013) https://www.newyorker.com/tech/annals-of-technology/the-bitcoin-boom (Year: 2013).*

Kopfstein—The Mission to Decentralize the Internet—The New Yorker (Dec. 12, 2013) https://www.newyorker.com/tech/annals-of-technology/the-mission-to-decentralize-the-internet (Year: 2013).*

Nakamoto—Bitcoin A Peer-to-Peer Electronic Cash System (Archived Mar. 20, 2014) https://web.archive.org/web/20140320135003/https://bitcoin.org/bitcoin.pdf (Year: 2014).*

Public key fingerprint—Wikipedia (Jan. 28, 2016). https://en.wikipedia.org/w/index.php?title=Public_key_fingerprint&oldid=702084349 (Year: 2016).*

SHA-2-Wikipedia (Mar. 21, 2016). https://en.wikipedia.org/w/index.php?title=SHA-2&oldid=711124564 (Year: 2016).*

Jerry Brito and Andrea Castillo. "Bitcoin: A Primer for Policymakers". Mercatus Center (2013). (Year: 2013).*

Swan, Melanie. "Blockchain Thinking: The Brain as a Decentralized Autonomous Corporation". IEEE Technology and Society Magazine. Dec. 2015. pp. 41-52. (Year: 2015).*

"Smart Oracles: A Simple, Powerful Approach to Smart Contracts" by Stefan Thomas and Evan Schwartz (Edited Jul. 17, 2014. Printed Jun. 8, 2015). https://github.com/codius/codius/wiki/Smart-Oracles:-A-Simple,-Powerful-Approach-to-Smart-Contracts (Year: 2015).*

"Smart Contracts on Bitcoin Blockchain". BitFury Group. Sep. 4, 2015 (Version 1.1) (Year: 2015).*

"Corda: A Distributed Ledger. Technical Whitepaper". By Mike Hearn. Nov. 29, 2016 (Version 0.5) (Year: 2016).*

"Ethereum: Platform Review. Opportunities and Challenges for Private and Consortium Blockchains". By Vitalik Buterin. Jun. 1, 2016. https://www.scribd.com/doc/314477721/Ethereum-Platform-Review-Opportunities-and-Challenges-for-Private-and-Consortium-Blockchains (Year: 2016).*

"Using Blockchain Technology and Smart Contracts to Create a Distributed Securities Depository". By Eric Wall and Gustaf Malm. Jun. 29, 2016. (Year: 2016).*

Swift Institute Working Paper No. 2015-007. "The Impact and Potential of Blockchain on the Securities Transaction Lifecycle". By Michael Mainelli and Alistair Milne. Publication Date: May 9, 2016. (Year: 2016).*

Lewis Rinaudo Cohen; David Contreiras Tyler; Pamela Buxton, "Opening the Door," International Financial Law Review 35, No. 6 (Jul./Aug. 2016): 40-43 (Year: 2016).*

"Formalizing and Securing Relationships on Public Networks". By Nick Szabo. Originally published in 1997. https://nakamotoinstitute.org/formalizing-securing-relationships/ (Year: 1997).*

"Formalizing and Securing Relationships on Public Networks". By Nick Szabo. DOI: https://doi.org/10.5210/fm.v2i9.548. Sept. 1, 1997. https://firstmonday.org/ojs/index.php/fm/article/view/548 (Year: 1997).*

Vitalik Buterin. "Ethereum White Paper: A Next Generation Smart Contract & Decentralized Application Platform". (2014). https://cryptorating.eu/whitepapers/Ethereum/Ethereum_white_paper.pdf (Year: 2014).*

Alex Norta et al. "Conflict-Resolution Lifecycles for Governed Decentralized Autonomous Organization Collaboration". EGOSE '15: Proc. of 2015 2nd Int'l Conf. on Electronic Governance and Open Society: Challenges in Eurasia. Nov. 2015. pp. 244-257. https://doi.org/10.1145/2846012.2846052 (Year: 2015).*

Shadab, Houman B., "Regulating Bitcoin and Block Chain Derivatives" (Oct. 9, 2014). NYLS Legal Studies Research Paper, Available at SSRN: https://ssrn.com/abstract=2508707 or http://dx.doi.org/10.2139/ssrn.2508707 (Year: 2014).*

Brito, Jerry, et al. "Bitcoin Financial Regulation: Securities, Derivatives, Prediction Markets, and Gambling." Columbia Science and Technology Law Review, vol. 16, No. 1, Fall 2014, p. 144-221. HeinOnline. https://heinonline.org/hol-cgi-bin/get_pdf.cgi?handle=hein.journals/cstlr16&section=6 (Year: 2014).*

Bitfury Group: "Smart Contracts on Bitcoin Blockchain", Sep. 4, 2015, p. 1-9, p. 14-17.

Bertani, Thomas: "Understanding oracles—Oraclize", Feb. 18, 2016, p. 1-4.

Liu, Alec: "Smart Oracles: Building Business Logic With Smart Contracts", Jul. 16, 2014, p. 1-8.

International Search Report and Written Opinion dated Jun. 29, 2017, of the corresponding International Application PCT/IP2017/051834 filed Mar. 30, 2017.

Anonymous: "Making a User Service: Tutorial—ethereum/pyethapp Wiki—GitHub", Oct. 16, 2015 (Oct. 16, 2015), XP055714084, Retrieved from the Internet: URL:https://github.com/ethereum/pyethapp/wiki/Making-a-User-Service:-Tutorial [retrieved on Jul. 13, 2020].

Anonymous: "Oraclize Blog—The provably honest oracle service. ", Feb. 11, 2016 (Feb. 11, 2016), XP055714280, Retrieved from the Internet: URL:https://web.archive.org/web/20160211215340/http:/blog.oracllize.it/ [retrieved on Jul. 13, 2020].

Summons to Attend Oral Proceedings Pursuant to Rule 115(1) ECC for European Patent Application No. 17 717 502.3, dated Jul. 20, 2020.

"Oraclize, the provably-honest oracle service, is finally here!", pNetwork Team, https://medium.com/pnetwork/oraclize-the-provably-honest-oracle-service-is-finally-here-3ac48358deb8, Nov. 4, 2015, 3 pages.

* cited by examiner

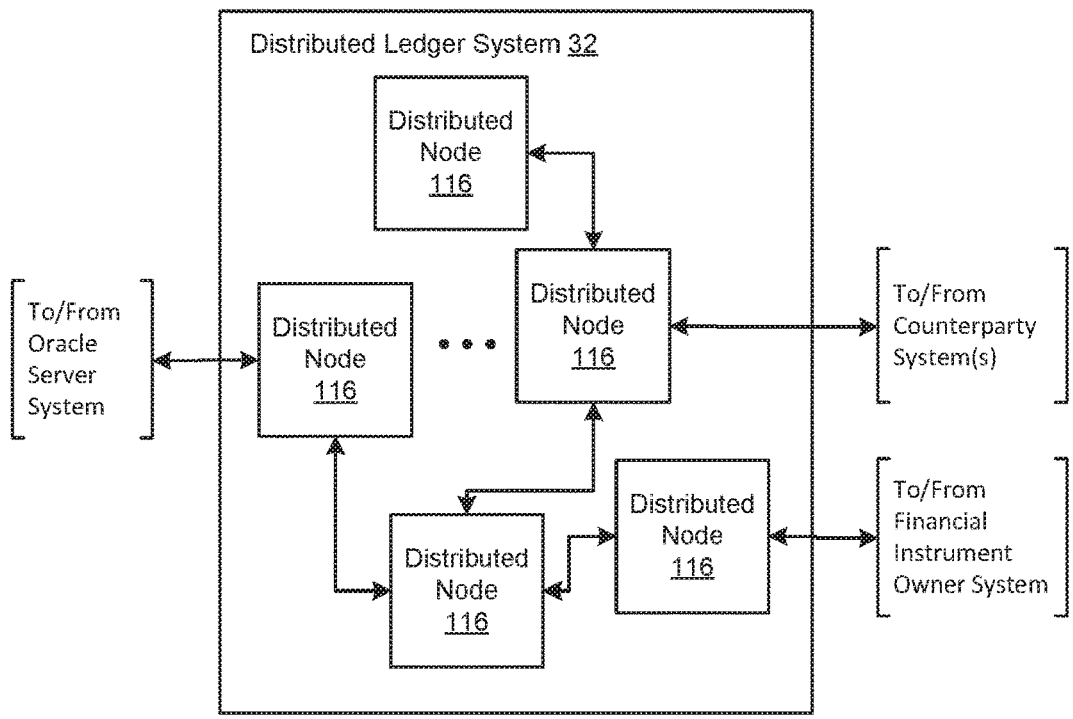
FIG. 5
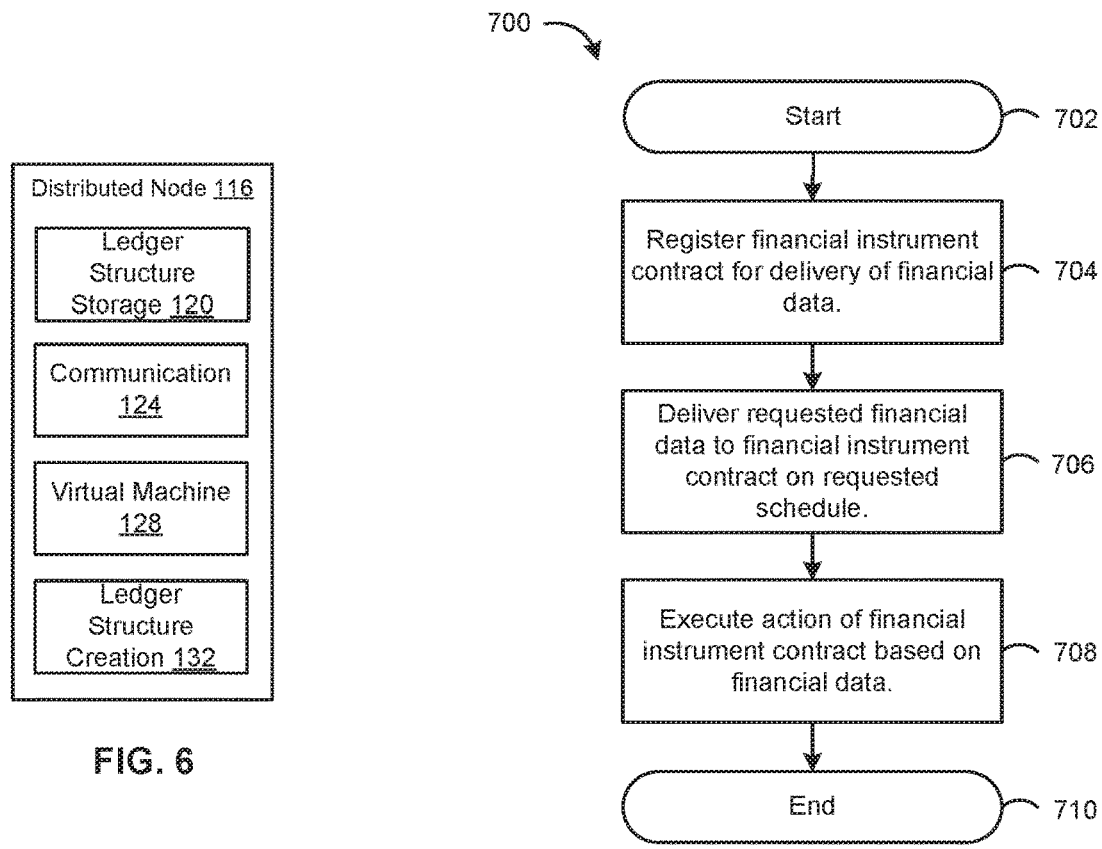
FIG. 6
FIG. 7

SYSTEMS AND METHODS FOR PROVIDING FINANCIAL DATA TO FINANCIAL INSTRUMENTS IN A DISTRIBUTED LEDGER SYSTEM

CROSS REFERENCE TO RELATED APPLICATIONS

This application claims priority to U.S. Provisional Patent Application No. 62/315,919, filed on Mar. 31, 2016, which is hereby incorporated by reference in its entirety.

BACKGROUND INFORMATION

Some types of distributed ledger systems enable a smart contract to be stored by the system for execution. Distributed applications and other configurations of these systems may build upon such smart contracts to provide various functionalities.

However, the use of smart contracts to provide functionalities has limitations. Smart contracts stored in distributed ledger systems do not themselves have direct access to data existing outside the distributed ledger system, which limits their usefulness in situations requiring such information. Smart contracts stored in distributed ledger systems are also not typically capable of acting in a fully autonomous manner, limiting their usefulness in scenarios in which it is desired that the smart contract take some action based on, e.g., outside information. Additionally, data stored in the distributed ledger system is typically publically visible, limiting the proprietary usefulness and security of smart contracts stored in distributed ledger systems relying on such data.

Furthermore, these limitations may be exacerbated in the financial field, where, for example, the closing of a financial instrument may depend upon a current price of some predefined financial equity or index etc.

Thus, a need exists for systems and methods to provide financial data to financial instruments in a distributed ledger system in an improved manner.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

FIG. 5 is a schematic diagram depicting an embodiment of the distributed ledger system.

FIG. 6 is a schematic diagram depicting an embodiment of a distributed node of the distributed ledger system.

FIG. 7 is a flowchart depicting an embodiment of a method of providing financial data to the financial instrument contract in the distributed ledger system.

DETAILED DESCRIPTION OF EXAMPLE EMBODIMENTS

Figure 1:
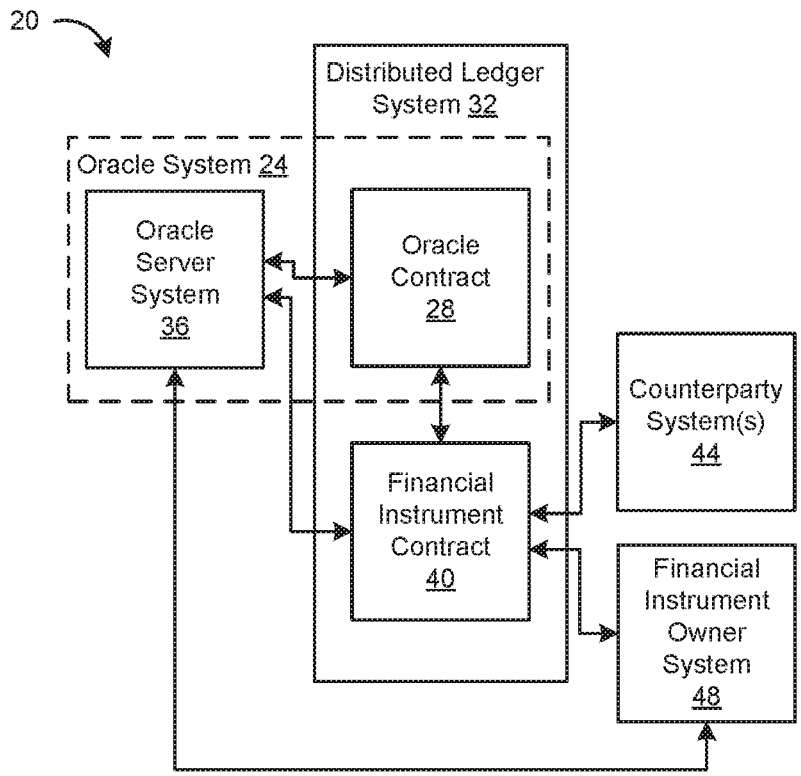
FIG. 1 is a schematic diagram depicting an embodiment of a system for providing financial data to a financial instrument contract in a distributed ledger system.

Embodiments of an oracle system, and associated methods, provide financial data to a financial instrument contract in a distributed ledger system in a manner that provides access for the financial instrument contract to data outside the distributed ledger system, increases the ability of the financial instrument contract to act autonomously, and maintains the privacy of requests for financial data and the delivered financial data.

The oracle system may register the financial instrument contract to receive requested financial data delivery. To perform registration, an oracle smart contract in the distributed ledger system may receive a registration transaction from the financial instrument smart contract, containing registration data indicating the requested financial data and delivery schedule, and store the registration data in a data structure in the distributed ledger system. An oracle server system outside of the distributed ledger system may monitor the distributed ledger system for the creation of new ledger structures, and in response to the creation of a new ledger structure, such as blocks of a blockchain in a blockchain system, read the data structure containing the registration data in the new ledger structure, and configure control systems to perform the data delivery accordingly.

The oracle system may then deliver the requested financial data to the financial instrument contract. To perform the financial data delivery, the oracle server system may monitor occurrence of a condition to trigger the financial data delivery, such as a scheduled delivery time or condition, and retrieve and/or calculate the requested financial data as a result. The oracle server system may then generate and transmit to at least one node of the distributed ledger system a transaction containing the requested financial data according to the requested schedule. In embodiments, the oracle server system may address the generated transaction to the oracle contract, which may then in response to receiving the transaction invoke the financial instrument contract to deliver the requested financial data. Alternatively, the oracle server system may address the generated transaction to the financial instrument contract directly, such as by generating a new address of the distributed ledger system for the transaction and a corresponding code to identify the transaction to the financial instrument contract as trusted.

In response to receiving the transaction, the financial instrument may execute an action based on the delivered financial data. For example, the financial instrument may determine at least one value based on the received financial data, such as a monetary value of the financial instrument, portion of the financial instrument, or intermediate payment of the financial instrument. The financial instrument may then invoke a function based on the determined value, such as a function to close an underlying transaction of the financial instrument, make an intermediate payment, etc.

FIG. 1 depicts an exemplary embodiment of a system 20 for providing financial data to a financial instrument in a distributed ledger system, including an oracle system 24 including an oracle contract 28 in a distributed ledger system 32 and an oracle server system 36, a financial instrument contract 40 in the distributed ledger system 32, one or more counterparty systems 44, and a financial instrument owner system 48. The distributed ledger system 32 provides a distributed ledger to store transactions, smart contracts, and associated data. The financial instrument contract 40, a smart contract of the distributed ledger system 32, represents a financial instrument. The oracle contract 28, a smart contract of the distributed ledger system 32, and the oracle server system 36 provide financial data delivery services to the financial instrument contract 40. The one or more counterparty systems 44 are used by one or more counterparties to the financial instrument to interact with the financial instrument contract 40. The owner system 48 is used by an owner of the financial instrument to interact with the financial instrument contract 40.

Figure 2:
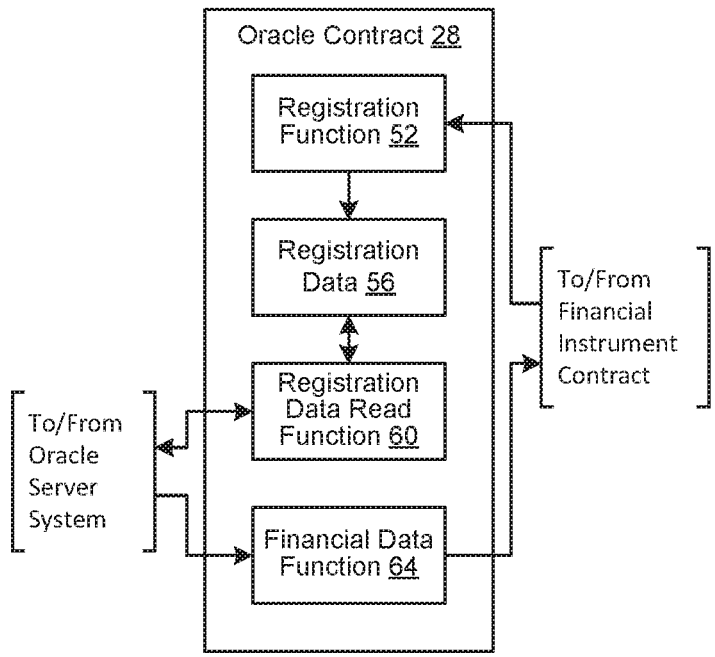
FIG. 2 is a schematic diagram depicting an embodiment of an oracle contract of an oracle system.

FIG. 2 depicts an exemplary embodiment of the oracle contract 28, including a registration function 52, registration data structures 56, a registration data read function 60, and a financial data function 64. A smart contract may include program instructions that may be executed by components of the distributed ledger system in response to transactions transmitted in the distributed ledger system addressed to the smart contract. As indicated above, the oracle contract 28 provides financial data delivery services to the financial instrument contract 40 as discussed herein.

The registration function 52 is a program function providing services to register the financial instrument contract 40 for financial data delivery. The registration function 52 may be invoked by transactions addressed to the oracle contract 28 from financial instruments. The registration function 52 receives as input a request from the invoking financial instrument contract 40 to register to receive indicated financial data delivery services, and as a result stores received registration data in the registration data structures 56 of the oracle contract 28 in the distributed ledger system 32.

The registration data structures 56 are data structures of the oracle contract 28 in the distributed ledger system 32 used to store data of the oracle contract 28. In response to receiving a request to register for data delivery services from the financial instrument contract 40, the registration function 52 stores the registration data in the registration data structures 56.

The registration data read function 60 is a program function to read the data stored in the registration data structures 56. The registration data read function 60 is a read call that may be invoked by the oracle server system 36. Read calls may be invoked directly by executing the oracle contract 28, such as without requiring a transaction addressed to the oracle contract 28. The registration data read function 60 receives as input a request to read the registration data stored in the registration data structures 56, and in response reads and provides as an output the registration data stored in the registration data structures 56.

The financial data function 64 is a program function to provide requested financial data to a requesting financial instrument contract 40. The financial data function 64 may be invoked by a transaction addressed to the oracle contract 28 from the oracle server system 36 containing the requested financial data. The financial data function 64 receives as input the requested financial data and an address of the requesting financial instrument contract 40, and in response invokes the requesting financial instrument contract 40 to deliver the requested financial data. Alternatively, to deliver the requested financial data, the financial data function 64 may generate and transmit to a distributed node 116 of the distributed ledger system 32 a transaction addressed to the requesting financial instrument contract 40 and containing the requested financial data.

In embodiments, the oracle contract 28 may include only any subset of, or an alternative connection of, the features depicted in or discussed herein in regard to FIG. 2.

In embodiments, the oracle contract 28 may include the functionalities discussed above or elsewhere herein organized into one or more program functions in an alternative manner, and the systems and methods discussed herein may instead utilize such alternative program functions. For example, instead of the plurality of separate program functions performing the indicated functionalities discussed above, the oracle contract 28 may include a corresponding single program function, a lesser number of separate program functions, or even a greater number of program functions that perform the functionalities.

Figure 3:
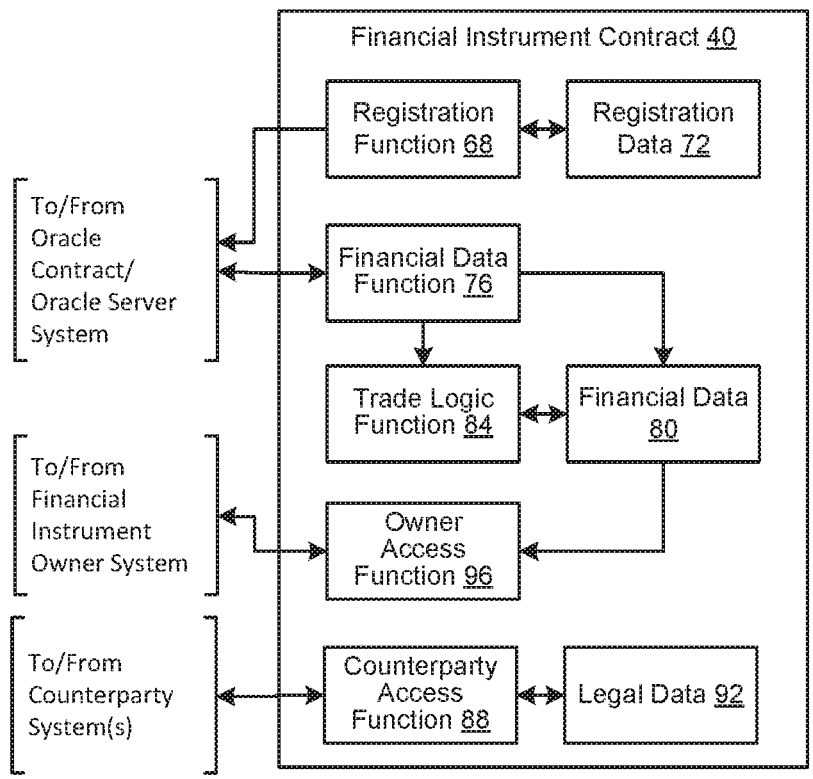
FIG. 3 is a schematic diagram depicting an embodiment of a financial instrument contract.

FIG. 3 depicts an exemplary embodiment of the financial instrument contract 40, including a registration function 68, registration data structures 72, a financial data function 76, financial data structures 80, a trade logic function 84, counterparty access function 88, legal data structures 92, and an owner access function 96. The financial instrument contract 40 may represent a financial instrument stored and executing in the distributed ledger system 32. The financial instrument may be, e.g., a bond, an option contract, difference contract, combined assets, an index future, etc., among other financial instrument types.

The registration function 68 is a program function to request to register the financial instrument contract 40 for financial data delivery. The registration function 68 may be invoked by the financial instrument contract 50 upon creation and signing by one or more counterparties of the financial instrument contract 40. The registration function 68 reads registration data stored in the registration data structure 72, and generates and transmits a transaction addressed to the oracle contract 28 and containing the registration data to a distributed node 116 of the distributed ledger system 32 to request registration for the financial data delivery.

The registration data structures 72 are data structures of the financial instrument contract 40 in the distributed ledger system 32 used to store the registration data of the financial instrument contract 40. The registration data defines the requested financial data delivery, and may include an indication of the identity of the financial data that is being requested, and an indication of the schedule on which the requested financial data is to be delivered. In embodiments, the registration data stored in the registration data structures 72, and eventually delivered to the oracle contract 28, is encrypted to protect the privacy of the data in view of the public nature of components of many distributed ledger systems. The registration data may be encrypted outside of the distributed ledger system 32 and written to the registration data structures 72 either as part of a process of creating the financial instrument contract 40 or subsequent to such a process.

The financial data function 76 is a program function to receive the requested financial data. The financial data function 76 may be invoked by a function call of the oracle contract 28 containing the requested financial data, or by a transaction addressed to the financial instrument contract 40 from the oracle server system 36 containing the requested financial data. The financial data function 76 receives as input the requested financial data, and in response performs at least one of storing the received financial data in the financial data structures 80, or invoking another function such as the trade logic function 84.

The financial data structures 80 are data structures of the financial instrument contract 40 in the distributed ledger system 32 used to store the financial data received by the financial instrument contract 40. In response to receiving a transaction containing the requested financial data, the financial data function 76 stores the received financial data in the financial data structures 80.

The trade logic function 84 is a program function to perform an action of the financial instrument contract 40 based on the received financial instrument data. The trade logic function 84 may be invoked by another function such as the financial data function 76. The trade logic function 84 may perform one or more of receiving the financial data from the invoking function or retrieving the financial data from the financial data structure 80, evaluating at least one value based on the financial data, determining whether any action is required in response to the evaluated value, and if so performing such action, such as closing all or part of the financial instrument 40 or a trading position represented by the financial instrument, etc.

The owner access function 96 is a program function to provide access to the financial instrument contract 40 for an owner of the financial instrument, e.g., to track its current or projected status and/or financial value. The owner access function 96 is a read call that may be invoked by the owner system 48. In response to being invoked, the owner access function 96 may read the latest received financial data, and provide as an output information of the financial instrument contract 40, such as, e.g., the financial data, a value of the financial instrument calculated by based on the financial data (such as a current or projected closing value, an intervening payment value, etc.), or a combination thereof.

The counterparty access function 88 is a program function to enable signing of the financial instrument contract 40 by one or more counterparties to the financial instrument. The counterparty signing function 88 may be invoked by a transaction addressed to the financial instrument contract 40 from a counterparty system 44. In response to being invoked, the counterparty signing function 88 may perform one or more of: providing access for the counterparty to legal data of the financial instrument such as a legal contract defining the financial instrument, or receiving a signature of the counterparty to the financial instrument.

The legal data structures 92 are data structures of the financial instrument contract 40 in the distributed ledger system 32 used to store legal data of the financial instrument contract 40, such as a legal contract of the financial instrument.

In embodiments, the financial instrument contract 40 may include only any subset of, or an alternative connection of, the features depicted in or discussed herein in regard to FIG. 3.

In embodiments, the financial instrument contract 40 may include the functionalities discussed above or elsewhere herein organized into one or more program functions in an alternative manner, and the systems and methods discussed herein may instead utilize such alternative program functions. For example, instead of the plurality of separate program functions performing the indicated functionalities discussed above, the financial instrument contract 40 may include a corresponding single program function, a lesser number of separate program functions, or even a greater number of program functions that perform the functionalities.

Figure 4:
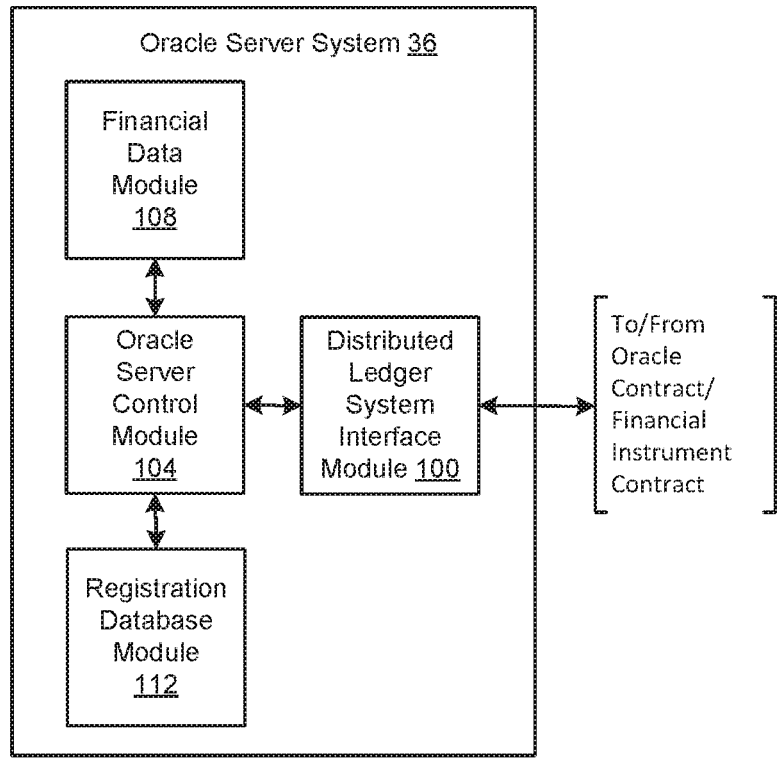
FIG. 4 is a schematic diagram depicting an embodiment of an oracle server system of the oracle system.

FIG. 4 depicts an embodiment of an oracle server system 36, including a distributed ledger system interface module 100, an oracle server system control module 104, a financial data system module 108, and a registration database module 112. The oracle server system 36 is located outside of the distributed ledger system 32, and provides, in conjunction with the oracle contract 28, the financial data delivery services to the financial instrument contract 40 as discussed herein.

The distributed ledger system interface module 100 provides a communication interface between the oracle server system 36 and the distributed ledger system 32. The interface module 100 may interact with a communication interface of the distributed ledger system 32 to communicate data between the oracle sever system 36 and the distributed ledger system 32, such as of transactions and read calls, to provide the financial data delivery services.

The oracle server control module 104 provides control logic to implement the financial data delivery services in conjunction with the oracle contract 28. For example, the control module 104 may control the reading and decryption of registration data from the registration data structure 56 of the oracle contract 28 to register financial instruments to receive requested financial data, retrieval and potentially calculation of the requested financial data from the financial data system 108 on a requested schedule, generation and transmission of transactions containing the requested financial data ultimately destined to the financial instrument contract 40 on the requested schedule, etc.

The financial data system module 108 provides a source of financial data that may be delivered to the financial instrument contract 40. The financial data system 108 may include one or more application programming interfaces (APIs) and a database of financial information. The APIs receive as an input a request for identified financial informational from the oracle server control module 104, read the requested financial data from the financial data database, and provide as an output to the oracle server control module 104 the requested financial data. In embodiments, the entire oracle server system 36, including the financial data system 108, is contained within a single security zone, and thus the oracle server control module 104 may request and receive the financial data from the financial data system module 108 without data encryption and further architectural security features as may be required with requesting and receiving data from a data source outside of a security zone.

The registration database module 112 provides storage for the registration data received from the financial instruments. The oracle server control module 104 may perform a call to the registration data read function 60 of the oracle contract 28, receive the registration data stored by the oracle contract 28 from the financial instrument contract 40 as a result, decrypt the registration data if encrypted, and store the registration data, or data based thereon, in the registration database module 112.

In embodiments, the oracle server system 36 may include only any subset of, or an alternative connection of, the features depicted in or discussed herein in regard to FIG. 4.

FIG. 5 depicts an exemplary embodiment of the distributed ledger system 32 including a plurality of distributed nodes 116. The distributed nodes 116 are organized as a peer-to-peer network, in which each of the nodes 116 may connect to one or more of the other nodes 116 using a peer-to-peer communication protocol. At least one of the distributed nodes 116 also connects to the oracle server system 36, at least one the distributed nodes 116 connects to the counterparty system(s) 44, and at least one of the distributed nodes 116 connects to the financial instrument owner system 48. As a peer-to-peer network, the configuration of connections between individual distributed nodes 116 may change over time according to operation of the peer-to-peer protocol.

In embodiments, the distributed ledger system 32 may be a blockchain system in which the distributed ledger, including the transactions and other data stored in the ledger, is provided in the form of a sequence of structured data blocks, also referred to as a blockchain. In other embodiments, the distributed ledger system 32 may be another type of distributed ledger system instead of a blockchain system, in which the ledger, including the transactions and other data stored in the ledger, may be organized into a structure other than blocks of a blockchain.

FIG. 6 depicts an exemplary embodiment of the distributed node 116 of the distributed ledger system 32, including a ledger structure storage module 120, a communication module 124, a virtual machine module 128 and a ledger structure creation module 132. The ledger structure storage module 120 stores data structures into which the ledger of the distributed ledger system 32 is organized. In embodiments in which the distributed ledger system 32 is a blockchain system, the ledger structure storage module 120 is a block storage module that stores the blocks of the blockchain system. The communication module 124 performs communications between the distributed node 116 and other distributed nodes 116 and other systems or components connected to the distributed node 116, such as one or more of the oracle server system 36, counterparty system(s) 44, financial instrument owner system 48, etc. The virtual machine module 128 executes contracts stored on the distributed ledger of the distributed ledger system 32. The ledger structure creation module 132 performs an algorithm to incorporate transactions and other data into ledger structures of the distributed ledger system 32, such as a data encryption algorithm of a selected complexity. In embodiments in which the distributed ledger system 32 is a blockchain system, the ledger structure creation module 132 is a block creation module performing an algorithm to incorporate transactions and other data into blocks of the blockchain of the blockchain system, also referred to as mining blocks of the blockchain system.

In embodiments, the distributed node 116 may include only any subset of, or an alternative connection of, the features depicted in or discussed herein in regard to FIG. 6.

Components of the system 20 for providing financial data, such as the oracle server system 36, distributed ledger system 32, counterparty system 44, and financial instrument owner system 48, may be implemented as hardware, software, or a mixture of hardware and software. For example, each of the oracle server system 36, nodes 116 of the distributed ledger system 32, counterparty system 44, financial instrument owner system 48, and/or any individual one, subset, or all of the components thereof, may be implemented using a processor and a non-transitory storage medium, where the non-transitory machine-readable storage medium includes program instructions that when executed by the processor perform embodiments of the functions of such components discussed herein.

In embodiments, the oracle server system 36 may be a computer system, such as, e.g., a desktop computer, laptop computer, mobile computing device, network device, server, Internet server, cloud server, etc., owned or operated by a financial data service provider; the distributed nodes 116 of the distributed ledger system 32 each may be a computing system, such as, e.g., a desktop computer, laptop computer, mobile computing device, network device, server, Internet server, cloud server, etc., owned or operated by the financial data service provider or another entity or entities; the counterparty system 44 may be a computer system, such as, e.g., desktop computer, laptop computer, mobile computing device, network device, server, Internet server, cloud server, etc., owned or operated by the counterparty; and the owner system 48 may be a computer system, such as, e.g., desktop computer, laptop computer, mobile computing device, network device, server, Internet server, cloud server, etc., owned or operated by the financial instrument owner.

The oracle system 24 provides customizable financial data to the financial instrument contract 40 on a customizable schedule, thereby providing both outside data upon which trade logic of the financial instrument contract 40 may be evaluated and a customizable heartbeat enabling greater autonomy of the financial instrument contract 40 to execute this trade logic, with a high level of security.

FIG. 7 is a flowchart depicting an exemplary embodiment of a method 700 of providing financial data to the financial instrument contract. The method begins at step 702. At step 704, the oracle system 24 registers the financial instrument contract 40 to receive requested financial data delivery. For example, the oracle contract 28 may receive a registration transaction from the financial instrument contract 40, and the oracle server system 32 may read and configure corresponding oracle control systems 104 based on registration data of the registration transaction. At step 706, the oracle system 24 delivers the requested financial data to the financial instrument contract 40. For example, the oracle server system 36 may retrieve, calculate, etc. the requested financial data in accordance with the requested schedule, and deliver the retrieved financial data in transactions destined for the financial instrument contract 40. At step 708, an instrument functionality of the financial instrument contract 40 is performed as a function of the financial data. For example, in response to receiving the financial data, the financial instrument contract 30 may evaluate a value, such as a monetary value of the financial instrument, and close an underlying transaction or make an intermediate payment of the financial instrument as a result.

The method 700 of FIG. 7 may be performed repeatedly over time, as further financial instruments register with the oracle contract.

In other embodiments, a method of providing financial data to a financial instrument contract may include only any subset of, or an alternative ordering of, the features depicted in or discussed above in regard to FIG. 7.

Additionally, certain steps of the method 700 may be performed repeatedly over time, such as steps 706 and/or 708, as further financial data is delivered to the financial instrument contract 40 and/or further actions of the financial instrument contract 40 are executed.

Figure 8:
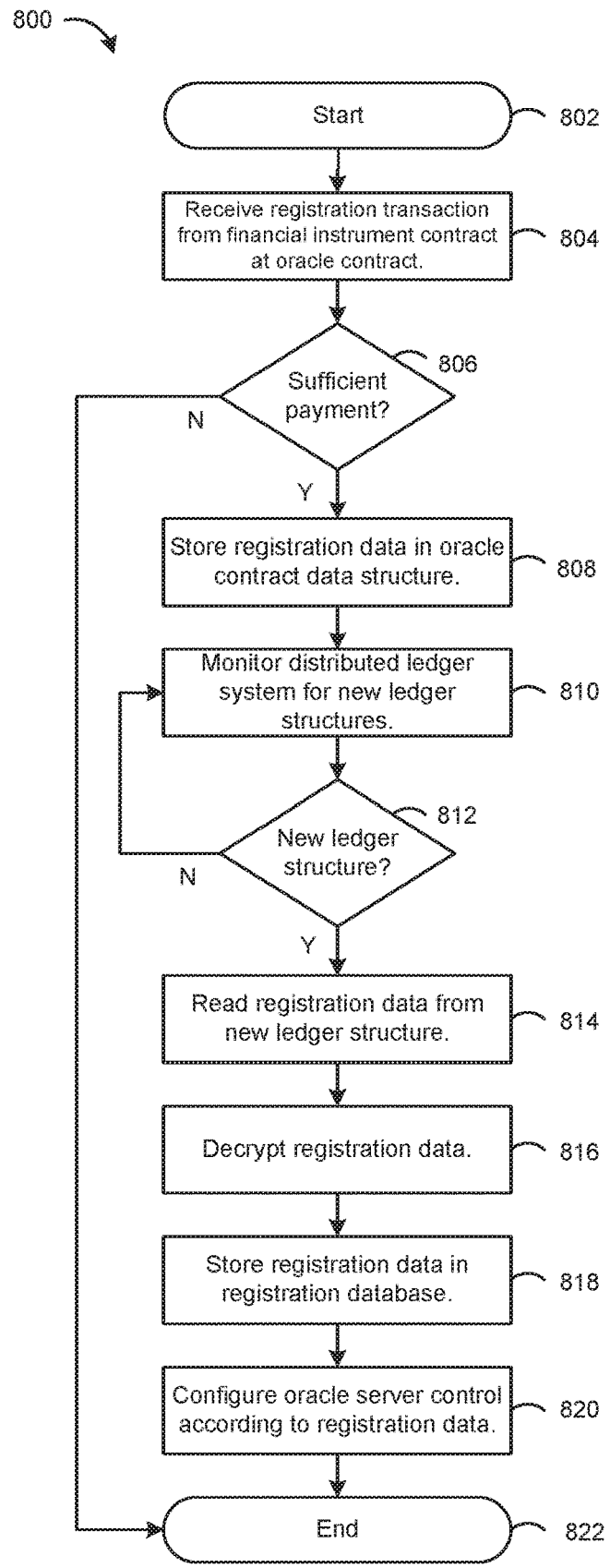
FIG. 8 is a flowchart depicting an embodiment of a method of registering the financial instrument contract for financial data delivery.

FIG. 8 is a flowchart depicting an exemplary embodiment of a method 800 to perform step 704 of method 700 of FIG. 7 of registering the financial instrument contract for financial data delivery. The method 800 begins a step 802. At step 804, the oracle contract 28 receives a transaction addressed to the oracle contract 28 from the financial instrument contract 40 requesting registration for financial data delivery. The transaction invokes the registration function 52 of the oracle contract 28. The transaction includes registration data including an indication of the identity of the requested financial data and an indication of the schedule on which the requested data is to be delivered.

The indication of the identity of the requested financial data may include identification of one or more specific piece(s) of financial data, one or more financial data values calculated based on financial data, or combinations thereof. The indication of the identity of specific pieces of financial data may include one or more indicators, such as codes, corresponding to the specific pieces of financial data, such as one or more of a specific equity, financial index, commodity future, interest rate, etc. In embodiments, the indication of the identity of the requested financial data includes one or more Reuters instrument codes (RICs) identifying the requested financial data. The indication of the identity of financial data values to be calculated may include one or more definitions of calculations to performed as a function of financial data, or a selection of one or more predetermined calculations defined by the oracle system, and an indication of specific pieces of financial data on which the calculations are to be performed.

The indication of the schedule at which the requested data is to be delivered may include an indication of one or more times at or conditions upon which the requested data is to be delivered. The indication of the times at which the requested data is to be delivered may include one or more of a minute, hour, day or month at which the financial data is to be delivered, such as in a repeating fashion. The indication of the condition upon which the requested data is to be delivered may include an indication of a numerical or logical condition, upon satisfaction of which the requested data is to be delivered, such as one or more threshold values that one or more specific pieces of financial data or calculated financial data values must cross, such as rise above or fall below.

Figure 9A:
FIGS. 9A-9C are schematic diagrams depicting an embodiment of registration data received from the financial instrument contract, a first portion of the registration data indicating requested financial data, and a second portion of the registration data indicating a requested delivery schedule, respectively.

FIG. 9A depicts an embodiment of the registration data RD contained in the transaction to register the financial instrument contract 40 for financial data delivery. The registration data RD includes a first portion FD, such including as one or more data bits or data words, containing the indication of the identity of the requested financial data, and a second portion SD, such as including as one or more data bits or data words, containing the indication of the schedule at which the requested data is to be delivered.

Figure 9B:

FIG. 9B depicts an embodiment of the first portion FD of the registration data RD in more detail, including a plurality of data segments FD1 . . . FDN, such as each including as one or more data bits or data words. In an exemplary embodiment, each of the data segments includes a code identifying a specific financial data quantity, such as, e.g., a specific equity, financial index, commodity future, interest rate, etc. For example, one data segment may indicate the Financial Times Stock Exchange 100 Index with the code FTSE, and another data segment may indicate the German Stock Index with the code DAX. In another exemplary embodiment, a subset of the a plurality of data segments includes an indication of one or more calculations to be performed, and another subset of the a plurality of data segments includes an indication of specific pieces of financial data upon which the calculations are to be performed. For example, one set of data segments may indicate that a weighted average of the values of a plurality of equities is to be calculated, another set of the data segments may indicate each the equities to be included in the weighted average using corresponding codes, and a further set of the data segments may indicate a weight for each of the equities (such as potentially representing a number of each equity included in the financial instrument).

Figure 9C:

FIG. 9C depicts an embodiment of the second portion SD of the registration data RD in more detail, including a plurality of data segments SD1 . . . SDN, such as each including as one or more data bits or data words, each indicating an aspect of a time at or condition upon which the requested data is to be delivered. In an exemplary embodiment, a first data segment indicates a minute of the time at which the financial data is to be delivered, a second data segment indicates an hour of the time at which the financial data is to be delivered, a third data segment indicates an day of the month of the time at which the financial data is to be delivered, a fourth data segment indicates a month of the year of the time at which the financial data is to be delivered, and a fifth data segment indicates a day of the week at which the financial data is to be delivered. The time specified may be a repeating delivery time. The data segments may use a cron-like syntax, such as a number to indicate a specific minute (e.g., 0-59), hour (e.g., 0-23), day of month (e.g., 1-31), month (e.g., 1-12), day of week (e.g., 0-6), etc., and a character to indicate certain predetermined permutations of such, such as a * to indicate no restrictions on such. For example, a second data portion SD including 0, 0, *, *, * may indicated that the financial data is to be delivered at the beginning of the 1st minute (0) of the 1st hour (0) of every day (*) of every week (*) of every month (*). In another exemplary embodiment, one or more of the data segments indicate one or more threshold values that one or more specified pieces of financial data or calculated financial data values must satisfy, such as rise above or fall below, to trigger the data delivery.

In embodiments, the registration data contained in the transaction requesting to register the financial instrument contract 40 is encrypted. The registration data may be encrypted by a system outside of the distributed ledger system 32, such as, e.g., by the financial instrument owner system 48, and stored in the financial instrument contract 40 in encrypted form at the time of its creation or sent to and stored by the financial instrument contract 40 in encrypted form at a later time. In embodiments, the registration data may be encrypted using a public key of the oracle system 36. In other embodiments, the registration data may be encrypted using a non-public-private-key encryption system, such as one or more of zero-knowledge proofs, homomorphic encryption, or ring signatures.

Returning to FIG. 8, at step 806, it is determined whether a sufficient payment exists for the transaction requesting to register the financial instrument contract 40 for the financial data delivery. The financial data delivery service may require payment. In embodiments, the payment is required to accompany the request to register for the financial data delivery. The accompanying payment may include a commodity of value in the distributed ledger system 32, such as tokens or links to tokens defined by the oracle system 24 within the distributed ledger system 32 to have a predetermined value, or some other monetary or value mechanism defined by the distributed ledger system. For example, payment for the financial data delivery service may require a number of tokens as a function of a number of pieces of financial data requested, a rate at which the requested financial data is to be delivered, or a combination thereof. In such embodiments, at step 806 the oracle system 24 may determine whether a sufficient number of tokens are attached to or linked to by the transaction requesting registration. Alternatively, the accompanying payment may take other forms, such as real world currency, payment accounts, etc. or links to such. In other embodiments, the payment may be arranged separately from the request to register for the financial data delivery. For example, the oracle system 24 may receive payment from the owner of the financial instrument via a mechanism outside of the distributed ledger system 32, such as via a secure connection between the oracle server system 36 and the financial instrument owner system 48. In response, the oracle system 24 may add an address of the financial instrument contract 40 to a list of addresses for which the oracle system 24 may accept registration requests and provide financial data delivery. In such embodiments, at step 806 the oracle system 24 may determine whether an address of the financial instrument contract requesting financial data delivery is on the list of approved addresses.

If at step 806 it is determined that sufficient payment does not exist for the transaction requesting registration, the method proceeds to step 822, where the method ends. If at step 806 it is determined that sufficient payment exists for the transaction requesting registration, the method proceeds to step 808.

At step 808, the oracle contract 28 stores the registration data contained in the transaction in the registration data structure 56 of the oracle contract 28. The oracle contract 28 may store the registration data in the registration data structure 56 as part of the invoked registration function 52. In embodiments in which the registration data is encrypted, the oracle contract 28 may store the registration data in the registration data structure 56 in its encrypted form.

At step 810, a component of the oracle server system 36 monitors the distributed ledger system 32 for the storage of new registration data by the oracle contract 28 by monitoring the distributed ledger system 32 for the creation of new ledger structures. New transactions and data stored in the distributed ledger system 32 may only be visible to systems outside of the distributed ledger system 32 after the new transactions and data have been incorporated into the distributed ledger in the form of a new ledger structure. As discussed above, new ledger structures are created by a ledger structure creation process of the distributed ledger system 32. In embodiments in which the distributed ledger system 32 is a blockchain system, the oracle server system 36 monitors the distributed ledger system 32 for the storage of new registration data by the oracle contract 28 by monitoring the distributed ledger system 32 for the creation of new blocks in the blockchain.

At step 812, it is determined whether a new ledger structure of the distributed ledger system 32 (e.g., a new block of a blockchain of a blockchain system) has been created based on the monitoring of the distributed ledger system 32 by the oracle server system 36. If at step 812, a new ledger structure has not yet been created, the method continues with the monitoring of the distributed ledger system 32 for new ledger structures of step 810. If at step 812, it is determined that a new ledger structure has been created, the method proceeds to step 814.

At step 814, the oracle server system 36 reads the registration data structure 56 from the new ledger structure to determine any new registration data in the new ledger structure. To read the registration data structure 56, the distributed ledger system interface module 100 communicates with a distributed node 116 of the distributed ledger system 32 under control of the oracle server control module 104 to invoke the registration data read function 60 of the oracle contract 28 to read the new registration data from the registration data structure 56. In embodiments in which the registration data is encrypted, the oracle server system 36 may read the registration data from the registration data structure 56 in its encrypted form.

At step 816, in embodiments in which the registration data is encrypted, the oracle server system 32 decrypts the registration data. In embodiments in which the registration data is encrypted using a public key of the oracle system, the oracle server control module 104 may decrypt the registration data using its private key. In embodiments in which the registration data may is encrypted using a non-public-private-key encryption system, such as one or more of zero-knowledge proofs, homomorphic encryption, or ring signatures, the oracle server control module 104 decrypts the registration data according to the specific one of these encryption schemes used. In embodiments in which the registration data is not encrypted, step 816 is omitted.

At step 818, the oracle server system 36 stores the registration data in the registration database module 112. For example, the oracle server control module 104 controls the storage of the registration data in the registration database module 112. In embodiments in which the registration data was initially encrypted, the oracle server system 36 stores the decrypted registration data in the registration database module 112.

At step 820, the oracle server system 36 configures its components to enact the delivery of the requested financial data at the requested schedule. For example, the oracle server control module 104 configures a control algorithm of this module, such as by setting a value of one or more control data variables and/or data registers, that controls performance of the requested financial data delivery. The method ends at step 820.

The method 800 of FIG. 8 may be performed repeatedly over time, as additional financial instruments register for financial data delivery.

In other embodiments, a method of registering the financial instrument contract 40 for financial data delivery may include only any subset of, or an alternative ordering of, the features depicted in or discussed above in regard to FIG. 8.

Figure 10:
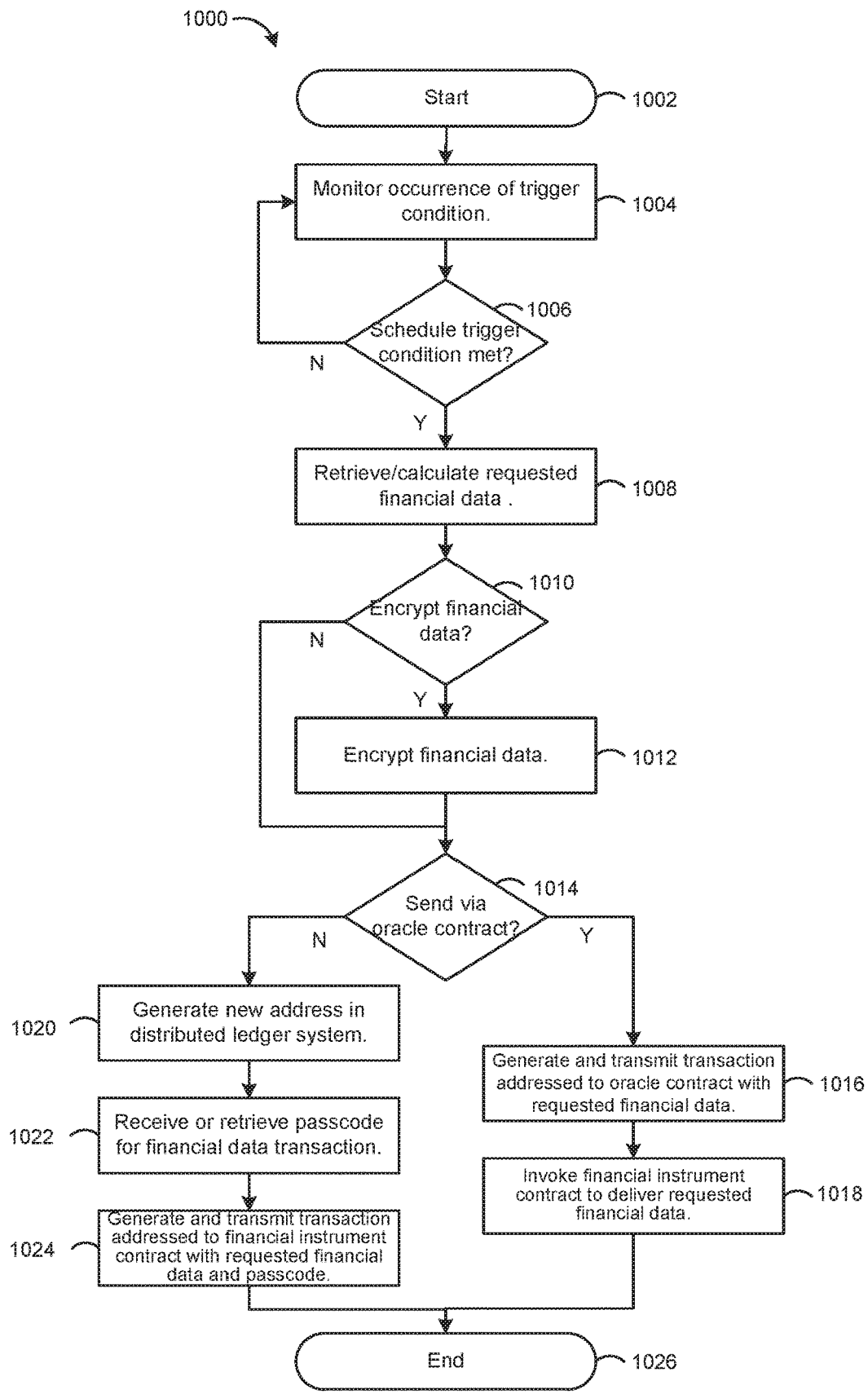
FIG. 10 is a flowchart depicting an embodiment of a method of delivering the requested financial data to the financial instrument contract.

FIG. 10 is a flowchart depicting an exemplary embodiment of a method 1000 to perform step 706 of method 700 of FIG. 7 of performing the requested financial data delivery to the financial instrument contract. The method 1000 begins a step 1002. At step 1004, the oracle server system 36 monitors the passage of time, financial data values and/or calculated values to identify the occurrence or impending occurrence of scheduled delivery times and/or conditions for the requested financial data. The oracle server control module 104 may perform the monitoring by comparing the output of a clock or other time component, or a current or calculated financial data value, to predetermined times or values at which the data delivery is scheduled to occur. In embodiments, the time monitoring may be performed according to a time system marked by the passage of one or more of seconds, minutes, hours, days, months, etc. In other embodiments, the monitoring of the passage of time may be performed according to a time system marked by the creation of new ledger structures.

At step 1006, it is determined based on the monitoring whether a trigger condition has been met to perform scheduled data delivery activities. In embodiments, the trigger condition may be the arrival of the scheduled time, financial data value or calculated financial data value, so that, e.g., the requested financial data is retrieved and/or calculated at the scheduled time or upon realization of the a specific financial data value or calculated financial data value. In other embodiments, the trigger condition may be the arrival of a predetermined time increment prior to the scheduled data delivery time, so that, e.g., sufficient time is left for retrieval and/or other delivery activates so that the actual delivery occurs at the scheduled time. In systems operating at a sufficiently high speed, the difference between these two approaches may be small.

If at step 1006, the trigger condition has not been met, the method continues the monitoring of step 1004. If at step 1006, the trigger condition has been met, the method proceeds to step 1008.

At step 1008, the oracle server system 36 retrieves, and if necessary further calculates, the requested financial data from the financial data system 108. To retrieve the financial data, the oracle server control module 104 requests the financial data from the financial data system 108, such as by issuing a data request identifying the financial data to the financial data system 108, such as to an API of the financial data system 108, which generates an output in response containing the requested financial data contained in a database of the financial data system 108. The identification of the financial data in the request may include the identifiers identifying the financial data in the registration data, such as one or more codes, e.g., RIC codes, identifying the financial data. To calculate the financial data, the oracle server control module 104 requests the financial data forming the basis of the calculation from the financial data system 108, and then performs a calculation of the requested financial data value (s) based on the retrieved financial data. In embodiments, the financial data upon which the calculation is to be performed may have already been retrieved as part of the monitoring of a condition at step 1004, and in such cases an additional retrieval of financial data may optionally be omitted.

At step 1010, the oracle server system 36 determines whether to encrypt the financial data to be delivered. The oracle server control module 104 may determine whether to encrypt the financial data based on various factors, such as how a particular instance of the oracle system 36 is configured, whether encrypted data was requested by the financial instrument contract 40, etc. Encrypting the financial data to be delivered to the financial instrument contract 40 may provide increased privacy of operation of the oracle system 24 and financial instrument contract 40, by preventing other entities from viewing the financial data delivered to the financial instrument contract 40. Encrypting the financial data may require the financial instrument contract 40 and financial instrument owner system 48 to participate in a decryption process for the delivered financial data. On the other hand, delivering the requested financial data unencrypted may decrease any burden on the financial instrument contract 40 and financial instrument owner system 48 presented by a need to decrypt the data. Although this may expose the delivered financial data to decreased privacy, such may be of reduced concern if it occurs in concert with the request being encrypted, which may serve to reduce the overall exposure of the delivered data.

If at step 1010, it is determined to encrypt the financial data, the method proceeds to step 1012. If at step 1010, it is determined to not encrypt the financial data, the method proceeds to step 1014.

At step 1012, the financial data is encrypted. The financial data may be encrypted by the oracle server control module 104. In embodiments, the financial data is encrypted using a public key of the financial instrument contract 40 or financial instrument owner system 48 or designated by one of these. In other embodiments, the financial data is encrypted using a non-public-private-key encryption system, such as one or more of zero-knowledge proofs, homomorphic encryption, or ring signatures.

At step 1014, the oracle server system determines whether to transmit the requested financial data to the financial instrument contract 40 by way of the oracle contract 28 or by way of a different address in the distributed ledger system 32. The oracle server control module 104 may determine whether to transmit the requested financial data by way of the oracle contract 28 or a different address based on various factors, such as a preference of financial instrument contract 40 or owner, how a particular instance of the oracle system 32 is configured, etc. Transmitting the requested financial data by way of the oracle contract 28 may provide a trusted channel for the financial data to arrive at the financial instrument contract 40, as the requested financial data will be arriving by way of the same contract to which the financial instrument contract 40 sent the request for the financial data. However, always transmitting the requested financial data by way of the oracle contract 28 may be predictable, and thus subject the data transmission to undesirable scrutiny and potential theft. Transmitting the requested financial data by way of an address in the distributed ledger system 32 different than that of the oracle contract 28, such as, e.g., a new address for each new transmission, may reduce the predictability of the financial data delivery, and thus reduce the attention and risk of theft that it attracts. Transmitting the requested financial data by way of different addresses may require further security features in order to provide a trusted data source to the financial instrument contract 40.

If at step 1014, it is determined to transmit the requested financial data to the financial instrument contact 40 by way of the oracle contract 28, the method proceeds to step 1016. At step 1016, the oracle server system 36 generates a transaction, addressed to the oracle contract 28, containing the requested financial data, and transmits the transaction to at least one node 116 of the distributed ledger system 32. As part of the ledger structure mining process, the distributed ledger system 32 incorporates the transaction into a new ledger structure and as a result it is executed by the oracle contract 28. The transaction invokes one or more functions of the oracle contract 28, such as the financial data function.

Figure 11:
FIG. 11 is a schematic diagram depicting an embodiment of the delivered financial data.

The financial data contained in the transaction includes a financial data value valid at the scheduled delivery time or condition, or a predetermined offset from such time, for each of the specific financial data types identified in the registration data. FIG. 11 depicts an embodiment of the financial data DFD contained in the transaction, including one or more data segments DFD1 . . . DFDN, such as each including as one or more data bits or data words, each including a financial data value valid at the current scheduled delivery time corresponding to a specific financial data types identified in the registration data. For example, if the registration data includes the codes FTSE and DAX, the financial data may include values of each of these indexes valid at the current scheduled delivery time.

At step 1018, the oracle contract 28 invokes the financial instrument contract 40 to deliver the requested financial data. The invocation may include a call by the oracle contract, such as during execution of the oracle contract by a distributed node of the distributed ledger system, of one or more functions of the financial instrument contact 40, such as the financial data function 76. In response to the call, the financial instrument contract may be retrieved and executed, such as by the distributed node, to perform the one or more functions of the financial instrument contract. The called function receives as an input from the oracle contract the requested financial data, and in response performs one or more of storing the financial data in the financial data structure 80 of the financial instrument contract 40, triggering another function of the financial instrument contract such as the trade logic function 84, etc. Alternatively, to deliver the financial data, at step 1018 the oracle contract 28 may instead generate a transaction, addressed to the financial instrument contract 40 and containing the requested financial data, and transmit the transaction to at least one node 116 of the distributed ledger system 32. The method ends at step 1026.

If at step 1014, it is determined to transmit the requested financial data to the financial instrument contact 40 by way of a different address, the method proceeds to step 1020. At step 1020, the oracle server system 36 generates a new address in the distributed ledger system 32. To generate the new address, the distributed ledger system interface module 100 communicates with a distributed node 116 of the distributed ledger system 32 under control of the oracle server control module 104 to invoke address generation functionality of the distributed ledger system 32.

At step 1022, the oracle server system 36 retrieves or generates a passcode for the financial data delivery. When the oracle system 24 delivers the financial data to the financial data instrument 40 using a new address for each delivery, the delivery may be accompanied by the passcode to identify the delivery from the new address to the financial instrument contract 40 as a trusted delivery. In embodiments, the oracle server system 36 may retrieve or receive a new passcode for every financial data delivery from the financial instrument owner, such as via a secure website or portal of the financial instrument owner system 48 or oracle server system 36. Alternatively, in other embodiments, the oracle server system 36 may itself generate a new passcode for every financial data delivery, and provide the generated passcode to the financial instrument owner, such as via a secure website or portal of the financial instrument owner system 48 or oracle server system 36.

At step 1024, the oracle system server system 36 generates a transaction, addressed to the financial instrument contract 40, containing the requested financial data and the passcode, and transmits the transaction to at least one node 116 of the distributed ledger system 32. As part of the ledger structure mining process, the distributed ledger system 32 will incorporate the transaction into a new ledger structure and as a result it will be executed by the financial instrument contract 40. The financial instrument contract 40 examines the passcode to determine if the delivery is trusted, such as by comparing the passcode to a corresponding passcode it has received from the financial instrument owner system 48, or first performing a hash of the received passcode and comparing the hash to a hashed passcode it has received from the financial instrument owner system 48. As discussed above, the transaction invokes one or more functions of the financial instrument contact 40, such as the financial data function 76, which in response performs one or more of storing the financial data in the financial data structure 80 of the financial instrument contract 40, triggering another function of the financial instrument contract 40 such as the trade logic function 84, etc. The method ends at step 1026.

The method 1000 of FIG. 10 may be performed repeatedly over time, as additional financial data deliveries are made and/or additional financial instruments register for financial data delivery.

In other embodiments, a method of performing the financial data delivery to the financial instrument contract 40 may include only any subset of, or an alternative ordering of, the features depicted in or discussed above in regard to FIG. 10.

For example, embodiments of a method of performing the financial data delivery to the financial instrument contract 40 may be configured according to a known formulation, such as always encrypting the financial data or not and/or always sending the financial data via the oracle contract 28 or not, or some mixed combination thereof, and omit determinations and corresponding unused steps depicted in FIG. 10.

Figure 12:
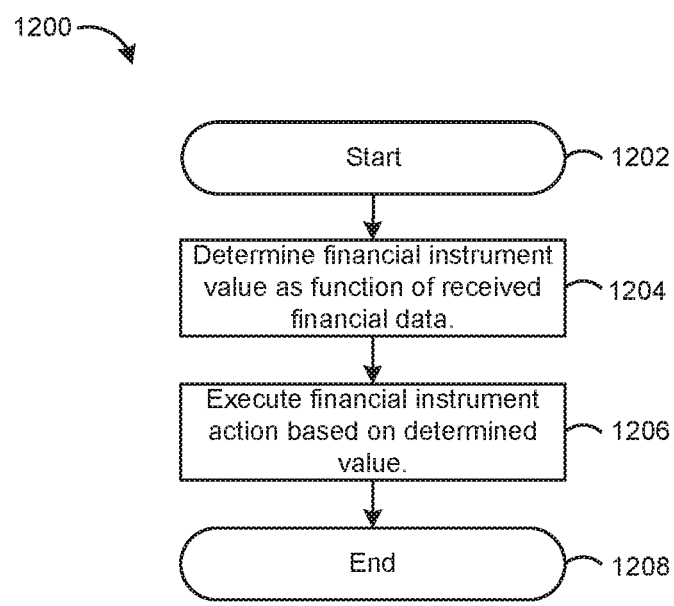
FIG. 12 is a flowchart depicting an embodiment of a method of performing an instrument functionality in response to the delivered financial data.

FIG. 12 is a flowchart depicting an exemplary embodiment of a method 1200 to perform step 708 of method 700 of FIG. 7 of performing an instrument functionality as a function of the financial data. At step 1204, in response to receiving a transaction or invocation containing the scheduled financial data delivery, the financial instrument contract 40 evaluates at least one value based on the received financial data. To evaluate the value, a function invoked by the transaction or invocation containing the financial data, such as the financial data function 76, may invoke another function, such as the trade logic function 84, in response to receiving the transaction or invocation containing the financial data to perform the evaluation of the value. Alternatively, the function invoked by the transaction or invocation containing the financial data may itself perform the evaluation of the value. The value evaluated may be a monetary valuation of the financial instrument based on the financial data, or some part or mechanism of the financial instrument, such as a value of a payment due to be made by the financial instrument, based on the financial data, e.g., a value of a coupon to be paid by a bond, which may depend upon an interest rate contained in the financial data.

At step 1206, the financial instrument contract 40 executes an action based on the value determined as a function of the financial data. To execute the action, the trade logic function 84 invoked by the financial data function 76 determines whether any action is required in response to the evaluated value, such as by one or more of comparing the evaluated value to a threshold value, or determining that a predetermined action is required as a function of a definition of the financial instrument. For example, the trade logic function 84 may close all or part of the financial instrument or a trading position represented by the financial instrument in response to comparing the evaluated value to a threshold value, e.g., in response to the financial instrument value falling below a threshold value, as in the case of stop-loss defined financial instrument, or the value of the financial instrument rising above the threshold value, as in the case of a profit-level defined financial instrument. In another example, the trade logic function 84 may make a payment or trigger the making of a payment of the financial instrument or a trading position represented by the financial instrument as a function of the evaluated value, such as making or trigger a payment of a coupon of a bond instrument based on an interest rate of the financial data.

In step 1206, if the action executed is a closing of the financial instrument, the financial instrument contract 40 also transmits a transaction addressed to the oracle contract 28 indicting that the financial data delivery is no longer needed. In response, the oracle system 24 stops delivery of the financial data to the financial instrument contract 40. In this way, the oracle system 24 does not transmit unnecessary transactions to the distributed ledger system 32, eliminating the cost and performance drain of such unnecessary transactions.

In embodiments in which the oracle system 24 delivers one or more calculated financial data values to the financial instrument contract 40, the method 1200 may optionally omit step 1204, and in step 1206 execute the action based on the received calculated financial data value instead of a value calculated by the financial instrument contract 40 itself. Alternatively, the method in step 1204 may calculate a further financial value, and in step 1206 execute the action based on the calculated further financial value.

The method 1200 of FIG. 12 may be performed repeatedly over time, as additional financial data deliveries are made and/or additional financial instruments register for financial data delivery.

In other embodiments, a method of performing an instrument functionality as a function of the financial data may include only any subset of, or an alternative ordering of, the features depicted in or discussed above in regard to FIG. 12.

In embodiments, a method of providing financial data services may include any combination of the methods of FIGS. 7, 8, 10 and 12, or any combination of any subset and/or alternative ordering of the features of such methods.

Some further specific examples of the above systems and methods may be illustrative. In a first further specific example, a financial instrument may request a single piece of financial data at a specified time. The financial instrument represented by the financial instrument contract may be, e.g., a Euro-U.S. Dollar (EUR-USD) foreign exchange market (forex) binary option contract with a fixed expiration time. Intraday forex binary options may expire hourly, while weekly binary options may expire at 3 pm on Friday. Thus, the financial instrument contract may submit a request to the oracle contract for a currency pair price, i.e., EUR and USD, at the expiry date/time, and the oracle system may deliver a single transaction containing currency pair price to the option financial instrument contract at the expiry date/time.

In another further specific example, a financial instrument may request that financial data is scheduled to be sent once a day at the close of trading. The financial instrument represented by the financial instrument contract may be, e.g., a contracts for difference that may incur an overnight financing fee. This process is typically done at 10 pm United Kingdom (UK) time. The financial instrument contract may send a request to the oracle contract for the London Interbank Offered Rate (LIBOR) to be sent to the financial instrument contract once daily at 10 pm UK time.

In another further specific example, a financial instrument may request that financial data be scheduled to be sent as frequently as possible, such as once in every ledger structure of the distributed transaction system, e.g., once in every block of a blockchain system. The financial instrument represented by the financial instrument contract may be a basket of assets consisting of, e.g., fifteen or more stocks, where the value of the financial instrument is calculated using the weighted sum of these underlying assets. The financial instrument contract may request prices for all 15 of these stocks from the oracle contract at every ledger structure, and the oracle system may deliver a single transaction containing all 15 prices at every ledger structure.

In another further specific example, the financial instrument contract may request that financial data be scheduled to be sent when a specific price to be returned crosses a certain threshold. The financial instrument represented by the financial instrument contract may be an index future, which may be programmed to close some or all of its position if the index value falls below 10% (a stop loss) or rises above 10% of its initial value (take profit limit). The financial instrument contract request thus requires that the oracle contract only send a single transaction when these conditions are met, significantly reducing the number of transactions that would be needed if the financial instrument contract was updated with the value of the index at every ledger structure during trading hours.

In alternative embodiments of the systems and methods discussed herein, instead of or in addition to the oracle system 24 delivering the requested financial data or calculated financial data value to the financial instrument contract 40, the oracle system 24 may deliver to the financial instrument contract 40 information based on the indicated financial data or delivery condition, such as, e.g., an instruction to execute at least one function of the financial instrument contract 40 when the indicated condition is satisfied. For example, in the registering of the financial instrument contract 40, the registration data received from the financial instrument contract 40 may include, instead of or in addition to the indication of financial data and/or a calculation to be performed based on indicated financial data, at least one trade logic condition of the financial instrument contract 40, such as that a specific financial instrument function (e.g., closing the financial instrument, closing at least a portion of the financial instrument, making a payment of the financial instrument, etc.) is to be executed upon specific indicated financial data or calculation satisfying a specific condition (e.g., a specific index crossing a specific threshold, etc.). In response, in the generating and transmitting of a transaction containing data destined for the financial instrument contract 40, the oracle system 24 may monitor the indicated trade logic condition, and send the transaction when the indicated condition is satisfied instead of or in addition to at a scheduled time. The transaction may include, instead of or in addition to requested financial data, information based on the indicated financial data, condition or calculation, such as an instruction to execute the indicated financial instrument function when the financial data satisfies the indicated condition.

Additional embodiments of the oracle system 24, oracle server system 36, oracle contract 28, financial instrument contract 40, distributed ledger system 32, counterparty system 44, and financial instrument owner system 48, and associated methods 700, 800, 1000, 1200 of providing financial data to the financial instrument contract, registering the financial instrument contract for financial data delivery, delivering the requested financial data to the financial instrument contract, and performing an instrument functionality in response to the delivered financial data discussed herein are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of providing financial data from outside of a distributed ledger system to a financial instrument smart contract executing in a distributed ledger system, the distributed ledger system not providing any direct communication between smart contracts executing in the distributed ledger system and data sources external to the distributed ledger system, the distributed ledger system including a plurality of distributed nodes, each distributed node including at least one processor and at least one non-transitory storage medium, the financial instrument smart contract including program instructions configured to perform a financial transaction, the financial transaction requiring specific financial data to close, the at least one non-transitory storage medium of at least one of the distributed nodes storing the financial instrument smart contract, the at least one processor of the at least one distributed node configured to execute the program instructions of the financial instrument smart contract, the method comprising:

receiving, by an oracle smart contract, a first transaction from the financial instrument smart contract, the first transaction including a request for delivery of the specific financial data to the financial instrument smart contract, the request including registration data having an identification of the specific financial data to be delivered and an identification of a schedule on which to deliver the specific financial data, wherein the financial instrument contract represents at least one of: a foreign exchange market binary option contract, a contract for overnight financing fee difference, a group of assets including a plurality of stocks, or an index future contract;

storing, by the oracle smart contract during execution of the oracle smart contract by the distributed ledger system, the received registration data, including the identification of the specific financial data and the identification of the schedule, in a registration data structure of the oracle smart contract in a new ledger structure of the distributed ledger system in the non-transitory storage medium of the at least one distributed node;

wherein the oracle smart contract includes program instructions, the at least one non-transitory storage medium of the at least one distributed node storing the oracle smart contract, the at least one processor of the at least one distributed node configured to execute the program instructions of the oracle smart contract;

monitoring, by an oracle server system outside of the distributed ledger system, creation of ledger structures by the distributed ledger system to detect the new ledger structure;

in response to detecting the new ledger structure of the distributed ledger system being created, retrieving, by the oracle server system, the registration data from the new ledger structure, the retrieving including invoking a read function of the oracle smart contract to read the registration data from the registration data structure of the oracle smart contract;

in response to a trigger condition based on the requested schedule occurring, performing, by the oracle server system, at least one of: retrieving the requested financial data from a financial data system, or calculating the requested financial data;

generating, by the oracle server system, a second transaction including the financial data, the second transaction including the financial data being addressed to the oracle smart contract;

transmitting, by the oracle server system, the generated second transaction to at least one distributed node of the distributed ledger system at a time according to the requested schedule, wherein the transmitting the second transaction to the at least one distributed node causes the oracle smart contract to execute;

wherein the oracle server system includes at least one processor configured to control the retrieving, performing, generating and transmitting by the oracle server system; and the executing of the oracle smart contract in response to the second transaction includes at least one of: invoking by the oracle smart contract a financial data function of the financial instrument smart contract to deliver the financial data to the financial instrument smart contract, or generating and transmitting by the oracle smart contract a third transaction addressed to the financial instrument smart contract to deliver the financial data to the financial instrument smart contract;

wherein the invoking by the oracle smart contract the financial instrument smart contract or the transmitting by the oracle smart contract the third transaction to the financial instrument smart contract causes the financial instrument smart contract to execute and triggers a function of the financial instrument smart contract to close the financial transaction based on the financial data, wherein closing the financial instrument contract based on the financial data includes at least one of: closing the foreign exchange market binary option contract based on a currency pair price included in the financial data, closing the contract for overnight financing fee difference based on a difference in a financing fee included in the financial data, closing a transaction for the group of assets including the plurality of stocks based on prices for the plurality of stocks included in the financial data, or closing some or all of one or more positions of the index future contract based on an index value included in the financial data.

2. The method of claim 1, wherein the distributed ledger system is a blockchain system, and the ledger structure is a block of the blockchain system.

3. The method of claim 1, further comprising:
decrypting, by the oracle server system, the retrieved registration data;
storing the decrypted registration data in a database of the oracle server system; and
configuring the oracle server system to deliver the requested financial data on the requested schedule.

4. The method of claim 1, further comprising:
monitoring, by the oracle server system, for occurrence of the trigger condition based on the requested schedule.

5. The method of claim 4, further comprising encrypting the requested financial data.

6. The method of claim 5, wherein the encrypting is performed using at least one of: public-key encryption, zero-knowledge proofs, homomorphic encryption, or ring signatures.

7. The method of claim 1, wherein the identification of the financial data includes a code identifying at least one specific type of financial data.

8. The method of claim 1, wherein the identification of the financial data includes at least one instrument code.

9. The method of claim 1, wherein the identification of the financial data includes an identification of at least one of: an equity, a financial index, a commodity future, or interest rate.

10. The method of claim 1, wherein the identification of the financial data further includes an identification of a calculation to be performed based on at least one specific type of financial data.

11. The method of claim 1, wherein the identification of the schedule on which the financial data is to be delivered includes a time at which the financial data is to be delivered.

12. The method of claim 1, wherein the identification of the schedule on which the financial data is to be delivered includes at least one of: a minute at which the financial data is to be delivered, an hour at which the financial data is to be delivered, a day at which the financial data is to be delivered, or a month at which the financial data is to be delivered.

13. The method of claim 1, wherein the identification of the schedule on which the financial data is to be delivered includes an identification of a condition that the identified financial data must satisfy to trigger delivery.

14. The method of claim 13, wherein the condition includes a threshold that the identified financial data must pass.

15. The method of claim 1, further comprising determining, by the oracle smart contract, whether the transaction from the financial instrument smart contract contains a payment for delivery of the financial data.

16. The method of claim 15, wherein the payment for delivery of the financial data includes a token minted in the distributed ledger system.

17. The method of claim 1, further comprising:
determining at least one value based on the financial data; and
executing at least one function of the financial instrument smart contract based on the determined at least one value.

18. The method of claim 17, wherein the determining and the executing are performed by the financial instrument smart contract.

19. The method of claim 17, wherein the determining is performed by at least one of: the oracle smart contract, or an oracle server system outside of the distributed ledger system.

20. The method of claim 17, wherein the at least one function of the financial instrument smart contract includes at least one of: closing at least a portion of a financial instrument represented by the financial instrument smart contract, or making a payment required by the financial instrument.

21. The method of claim 1, further comprising:
generating a transaction addressed to the financial instrument smart contract, the transaction including an instruction to execute an action by the financial instrument smart contract; and
transmitting the generated transaction to at least one distributed node of the distributed ledger system.

22. A system for providing financial data to a financial instrument smart contract in a distributed ledger system, the system comprising:
at least one processor;
at least one non-transitory machine-readable storage medium having program instructions, which when executed by the at least one processor cause a method for providing financial data from outside of the distributed ledger system to the financial instrument smart contract executing in the distributed ledger system to be performed, the distributed ledger system not providing any direct communication between smart contracts executing in the distributed ledger system and data sources external to the distributed ledger system, the distributed ledger system including a plurality of distributed nodes, each distributed node including at least one processor and at least one non-transitory storage medium, the financial instrument smart contract including program instructions configured to perform a financial transaction, the financial transaction requiring specific financial data to close, the at least one non-transitory storage medium of at least one of the distributed nodes storing the financial instrument smart contract, the at least one processor of the at least one distributed node configured to execute the program instructions of the financial instrument smart contract, the method including:
receiving, by an oracle smart contract, a first transaction from the financial instrument smart contract, the first transaction including a request for delivery of the specific financial data to the financial instrument smart contract, the request including registration data having an identification of the specific financial data to be delivered and an identification of a schedule on which to deliver the specific financial data, wherein the financial instrument contract represents at least one of: a foreign exchange market binary option contract, a contract for overnight financing fee difference, a group of assets including a plurality of stocks, or an index future contract;
storing, by the oracle smart contract during execution of the oracle smart contract by the distributed ledger system, the received registration data, including the identification of the specific financial data and the identification of the schedule, in a registration data structure of the oracle smart contract in a new ledger structure of the distributed ledger system in the non-transitory storage medium of the at least one distributed node;
wherein the oracle smart contract includes program instructions, the at least one non-transitory storage medium of the at least one distributed node storing the oracle smart contract, the at least one processor of the at least one distributed node configured to execute the program instructions of the oracle smart contract;
monitoring, by an oracle server system outside of the distributed ledger system, creation of ledger structures by the distributed ledger system to detect the new ledger structure;
in response to detecting the new ledger structure of the distributed ledger system being created, retrieving, by the oracle server system, the registration data from the new ledger structure, the retrieving including invoking a read function of the oracle smart contract to read the registration data from the registration data structure of the oracle smart contract;
in response to a trigger condition based on the requested schedule occurring, performing, by the oracle server system, at least one of: retrieving the requested financial data from a financial data system, or calculating the requested financial data;
generating, by the oracle server system, a second transaction including the financial data, the second transaction including the financial data being addressed to the oracle smart contract;
transmitting, by the oracle server system, the generated second transaction to at least one distributed node of the distributed ledger system at a time according to the requested schedule, wherein the transmitting the second transaction to the at least one distributed node causes the oracle smart contract to execute;
wherein the oracle server system includes at least one processor configured to control the retrieving, performing, generating and transmitting by the oracle server system; and
the executing of the oracle smart contract in response to the second transaction includes at least one of: invoking by the oracle smart contract a financial data function of the financial instrument smart contract to deliver the financial data to the financial instrument smart contract, or generating and transmitting by the oracle smart contract a transaction addressed to the financial instrument smart contract to deliver the financial data to the financial instrument smart contract;
wherein the invoking by the oracle smart contract the financial instrument smart contract or the transmitting by the oracle smart contract the third transaction to the financial instrument smart contract causes the financial instrument smart contract to execute and triggers a function of the financial instrument smart contract to close the financial transaction based on the financial data, wherein closing the financial instrument contract based on the financial data includes at least one of: closing the foreign exchange market binary option contract based on a currency pair price included in the financial data, closing the contract for overnight financing fee difference based on a difference in a financing fee included in the financial data, closing a transaction for the group of assets including the plurality of stocks based on prices for the plurality of stocks included in the financial data, or closing some or all of one or more positions of the index future contract based on an index value included in the financial data.

23. The system of claim 22, wherein the distributed ledger system is a blockchain system.

24. The system of claim 22, the method further comprising:
determining at least one value based on the delivered financial data; and
executing at least one function of the financial instrument smart contract based on the determined at least one value,
wherein the determining and the executing are performed by at least one of: the financial instrument smart contract, the oracle smart contract, or an oracle server system, and
the at least one function of the financial instrument includes at least one of: closing at least a portion of a financial instrument represented by the financial instrument smart contract, or making a payment required by the financial instrument.

25. At least one non-transitory machine-readable media having program instructions, which when executed by at least one processor cause a method of providing financial data from outside of a distributed ledger system to a financial instrument smart contract executing in a distributed ledger system to be performed, the distributed ledger system not providing any direct communication between smart contracts executing in the distributed ledger system and data sources external to the distributed ledger system, the distributed ledger system including a plurality of distributed nodes, each distributed node including at least one processor and at least one non-transitory storage medium, the financial instrument smart contract including program instructions configured to perform a financial transaction, the financial transaction requiring specific financial data to close, the at least one non-transitory storage medium of at least one of the distributed nodes storing the financial instrument smart contract, the at least one processor of the at least one distributed node configured to execute the program instructions of the financial instrument smart contract, the method comprising:
receiving, by an oracle smart contract, a first transaction from the financial instrument smart contract, the first transaction including a request for delivery of the specific financial data to the financial instrument smart contract, the request including registration data having an identification of the specific financial data to be delivered and an identification of a schedule on which to deliver the specific financial data, wherein the financial instrument contract represents at least one of: a foreign exchange market binary option contract, a contract for overnight financing fee difference, a group of assets including a plurality of stocks, or an index future contract;
storing, by the oracle smart contract during execution of the oracle smart contract by the distributed ledger system, the received registration data, including the identification of the specific financial data and the identification of the schedule, in a registration data structure of the oracle smart contract in a new ledger structure of the distributed ledger system in the non-transitory storage medium of the at least one distributed node;
wherein the oracle smart contract includes program instructions, the at least one non-transitory storage medium of the at least one distributed node storing the oracle smart contract, the at least one processor of the at least one distributed node configured to execute the program instructions of the oracle smart contract;
monitoring, by an oracle server system outside of the distributed ledger system, creation of ledger structures by the distributed ledger system to detect the new ledger structure;
in response to detecting the new ledger structure of the distributed ledger system being created, retrieving, by the oracle server system, the registration data from the new ledger structure, the retrieving including invoking a read function of the oracle smart contract to read the registration data from the registration data structure of the oracle smart contract;
in response to a trigger condition based on the requested schedule occurring, performing, by the oracle server system, at least one of: retrieving the requested financial data from a financial data system, or calculating the requested financial data;
generating, by the oracle server system, a second transaction including the financial data, the second transaction including the financial data being addressed to the oracle smart contract;
transmitting, by the oracle server system, the generated second transaction to at least one distributed node of the distributed ledger system at a time according to the requested schedule, wherein the transmitting the second transaction to the at least one distributed node causes the oracle smart contract to execute;
wherein the oracle server system includes at least one processor configured to control the retrieving, performing, generating and transmitting by the oracle server system; and
the executing of the oracle smart contract in response to the second transaction includes at least one of: invoking by the oracle smart contract a financial data function of the financial instrument smart contract to deliver the financial data to the financial instrument smart contract, or generating and transmitting by the oracle smart contract a transaction addressed to the financial instrument smart contract to deliver the financial data to the financial instrument smart contract;
wherein the invoking by the oracle smart contract the financial instrument smart contract or the transmitting by the oracle smart contract the third transaction to the financial instrument smart contract causes the financial instrument smart contract to execute and triggers a function of the financial instrument smart contract to close the financial transaction based on the financial data, wherein closing the financial instrument contract based on the financial data includes at least one of: closing the foreign exchange market binary option contract based on a currency pair price included in the financial data, closing the contract for overnight financing fee difference based on a difference in a financing fee included in the financial data, closing a transaction for the group of assets including the plurality of stocks based on prices for the plurality of stocks included in the financial data, or closing some or all of one or more positions of the index future contract based on an index value included in the financial data.

* * * * *